US012573774B2

(12) United States Patent
Kaneko et al.

(10) Patent No.: US 12,573,774 B2
(45) Date of Patent: Mar. 10, 2026

(54) COAXIAL ELECTRICAL CONNECTOR

(71) Applicant: Hirose Electric Co., Ltd., Yokohama (JP)

(72) Inventors: Tsubasa Kaneko, Yokohama (JP); Takaki Sawaguchi, Yokohama (JP); Shuto Kishi, Yokohama (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 291 days.

(21) Appl. No.: 18/486,949

(22) Filed: Oct. 13, 2023

(65) Prior Publication Data

US 2024/0128664 A1 Apr. 18, 2024

(30) Foreign Application Priority Data

Oct. 18, 2022 (JP) ................................ 2022-166708

(51) Int. Cl.
*H01R 9/05* (2006.01)
*H01R 24/50* (2011.01)

(52) U.S. Cl.
CPC ......... *H01R 9/0524* (2013.01); *H01R 9/0515* (2013.01); *H01R 24/50* (2013.01)

(58) Field of Classification Search
CPC ..... H01R 9/0524; H01R 9/0515; H01R 24/50
USPC .......................................................... 439/583
See application file for complete search history.

(56) References Cited

U.S. PATENT DOCUMENTS

| | | | | | |
|---|---|---|---|---|---|
| 4,125,308 | A * | 11/1978 | Schilling | H01R 24/44 | |
| | | | | 333/260 | |
| 4,684,200 | A * | 8/1987 | Capp | H01R 24/50 | |
| | | | | 439/387 | |
| 5,192,230 | A * | 3/1993 | Gabany | H01R 13/6625 | |
| | | | | 333/260 | |
| 5,221,216 | A * | 6/1993 | Gabany | H01R 24/50 | |
| | | | | 333/185 | |
| 5,547,395 | A * | 8/1996 | Delamotte | H01R 9/0515 | |
| | | | | 439/578 | |
| 7,344,381 | B2 * | 3/2008 | Kerekes | H01R 13/658 | |
| | | | | 439/63 | |
| 8,616,898 | B2 * | 12/2013 | Lee | H01R 12/7047 | |
| | | | | 439/63 | |

(Continued)

FOREIGN PATENT DOCUMENTS

JP 2015-149184 A 8/2015

*Primary Examiner* — Tulsidas C Patel
*Assistant Examiner* — Thomas K Quigley
(74) *Attorney, Agent, or Firm* — Procopio, Cory, Hargreaves & Savitch LLP

(57) ABSTRACT

In order to provide a coaxial electrical connector that makes it easy to ensure excellent signal transmission quality even in broadband mode, dielectric bodies 30 are provided, including a first dielectric body 31 and a second dielectric body 32 provided such that a space 43B-1 is formed within an offset from the first dielectric body 31 at a location spaced apart from the first dielectric body 31 in the vertical direction; a center conductor 20 has an abutment portion 23C-2 abutting the second dielectric body 32 from below; the first dielectric body 31 retains the center conductor 20 in the radial direction; and the second dielectric body 32, when pressed from below by the abutment portion 23C-2, is resiliently deformable toward a space 43C formed directly above the second dielectric body 32.

3 Claims, 3 Drawing Sheets

(56) References Cited

U.S. PATENT DOCUMENTS

| | | | | |
|---|---|---|---|---|
| 8,979,581 | B2 * | 3/2015 | Paulus | H01R 9/05 439/578 |
| 9,379,498 | B2 * | 6/2016 | Kaneko | H01R 24/44 |
| 9,912,104 | B2 * | 3/2018 | Barr | H01T 4/08 |
| 11,367,982 | B2 * | 6/2022 | Haga | H01R 43/16 |
| 2004/0038587 | A1 * | 2/2004 | Yeung | H01R 24/44 439/581 |
| 2005/0245110 | A1 * | 11/2005 | Kerekes | H01R 12/721 439/79 |
| 2012/0088406 | A1 * | 4/2012 | Montena | H01R 24/564 439/585 |
| 2013/0029520 | A1 * | 1/2013 | Lee | H01R 12/7047 439/578 |
| 2013/0337682 | A1 * | 12/2013 | Paulus | H01R 24/44 439/578 |
| 2014/0004721 | A1 * | 1/2014 | Stein | H01R 43/00 29/874 |
| 2014/0065879 | A1 * | 3/2014 | Daughtry, Jr. | H01R 9/05 439/578 |
| 2015/0050834 | A1 * | 2/2015 | Paulus | H01R 9/05 439/578 |
| 2015/0222061 | A1 * | 8/2015 | Kaneko | H01R 24/44 439/581 |
| 2018/0048101 | A1 * | 2/2018 | Maruyama | H05K 3/308 |
| 2018/0151991 | A1 * | 5/2018 | Miyazaki | H01R 13/20 |
| 2021/0249827 | A1 * | 8/2021 | Haga | H01R 24/40 |

* cited by examiner

COAXIAL ELECTRICAL CONNECTOR

CROSS-REFERENCE TO RELATED APPLICATIONS

This application claims priority to Japanese Patent Application No. 2022-0166708, filed Oct. 18, 2022, the contents of which are incorporated herein by reference in its entirety for all purposes.

BACKGROUND

Technical Field

The present invention relates to a coaxial electrical connector connected to a circuit board.

Background Art

An example of this type of coaxial electrical connector, i.e., a coaxial electrical connector in which a dielectric body (insulating member), a center conductor, and an annular fitting are provided within an interior space of an outer conductor, has been disclosed in Patent Document 1. The interior space of the outer conductor is formed extending through the outer conductor in the vertical direction perpendicular to a mounting face on a circuit board. The dielectric body, which has a tubular configuration and is made of plastic, is disposed within said interior space at a location proximal to its bottom end, and the decoupling of the dielectric body and the center conductor is prevented by the fact that, after having been inserted into a retaining hole in the dielectric body, the vertically extending center conductor is retained in place by said dielectric body and, furthermore, by the fact that the annular fitting is attached from below.

The center conductor has a beveled protrusion protruding radially outwardly of said center conductor in the section inserted and retained within the retaining hole of the dielectric body, and, in a state in which the beveled protrusion abuts a stepped portion (indentation) formed in the inner peripheral surface of the retaining hole from below, is supported by the stepped portion from above. When the coaxial electrical connector is mounted to a circuit board, the center conductor, whose bottom end portion slightly protrudes from the bottom face of the outer conductor, is adapted to make contact with circuitry on the mounting face of the circuit board under contact pressure from above. At this time, contact pressure is generated between the center conductor and the circuitry of the circuit board because while the center conductor is constantly acted upon by a reaction force directed upwardly from the mounting face of the circuit board, the stepped portion of the dielectric body counteracts the above-mentioned reaction force by supporting the beveled protrusion of the center conductor from above.

PRIOR ART DOCUMENTS

Patent Documents

[Patent Document 1]
Japanese Published Patent Application No. 2015-149184.

SUMMARY OF THE INVENTION

Problems to be Solved by the Invention

According to Patent Document 1, the dielectric body, which is constructed as a single member, has the function of retaining the center conductor as well as the function of generating contact pressure between the center conductor and the circuitry of the circuit board. This dielectric body, which has a tubular configuration extending lengthwise in the vertical direction, is provided so as to fill the space between the inner peripheral surface of the outer conductor and the outer peripheral surface of the center conductor in the radial direction thereof. Consequently, within the vertical extent of the dielectric body, the band of usable frequencies becomes narrower in proportion to the absence of airspace in the above-mentioned radial direction between the inner peripheral surface of the outer conductor and the outer peripheral surface of the center conductor, which leads to a degradation of the broadband signal transmission quality in the coaxial electrical connector.

With such considerations in mind, it is an object of the present invention to provide a coaxial electrical connector that makes it easy to ensure excellent signal transmission quality even in broadband mode.

Means for Solving the Problems (1) The inventive coaxial electrical connector, which is a coaxial electrical connector connected to a circuit board, has: a metallic outer conductor, in which an interior space having an axis extending in the vertical direction perpendicular to the mounting face of the circuit board is formed disposed therethrough in the vertical direction; dielectric bodies, which are directly or indirectly retained within the interior space by the outer conductor; and a metallic center conductor, which extends in the vertical direction within the interior space, is retained by the dielectric bodies, and makes contact with the mounting face by means of its bottom end portion.

In the present invention, such a coaxial electrical connector is characterized by the fact that the dielectric bodies include a first dielectric body and a second dielectric body provided such that a space is formed within an offset from the first dielectric body at a location spaced apart from the first dielectric body in the vertical direction, the center conductor has an abutment portion abutting the second dielectric body from below, the first dielectric body retains the center conductor in the radial direction, and the second dielectric body, when pressed from below by the abutment portion, is resiliently deformable toward a space formed directly above the second dielectric body.

In the invention of (1), the dielectric bodies include a first dielectric body and a second dielectric body, with the first dielectric body having the function of retaining the center conductor in the radial direction, and the second dielectric body having the function of supporting the abutment portion of the center conductor from above. When the coaxial electrical connector is mounted to a circuit board, the bottom end portion of the center conductor is acted upon by a force (reaction force) directed upward from the circuit board. At this time, the second dielectric body is pressed by the abutment portion of the center conductor and is resiliently deformed upward, and the above-mentioned reaction force is counteracted by a resilient force generated by the second dielectric body. As a result, a state of contact under appropriate contact pressure is maintained between the contact portion of the center conductor and the circuit board.

In the invention of (1), the first dielectric body and second dielectric body are provided in a spaced relationship in the vertical direction, and a space is formed between the first dielectric body and second dielectric body. This means that within the extent in which this space is formed in the vertical direction, an airspace is present in the radial direction between the inner peripheral surface of the outer conductor and the outer peripheral surface of the center conductor. Therefore, in comparison with the conventional case, in which a single dielectric body extending lengthwise in the vertical direction is provided between the outer conductor and the center conductor, the band of usable frequencies becomes wider in proportion to the presence of the above-mentioned airspace, which makes it possible to ensure excellent signal transmission quality even in broadband mode.

(2) In the invention of (1), the first dielectric body may be provided downwardly of the second dielectric body.

(3) In the inventions of (1) or (2), the second dielectric body may have a higher deflection temperature under load than the first dielectric body. When the deflection temperature under load of the second dielectric body is higher than the deflection temperature under load of the first dielectric body, plastic deformation becomes unlikely even if the environment of use of the coaxial electrical connector becomes hotter. Therefore, with the abutment portion supported by the second dielectric body from above, the center conductor is unlikely to be moved upward from the regular position and the above-mentioned reaction force can be adequately counteracted by the resilient force of the second dielectric body. As a result, it becomes easier to maintain a state of contact under appropriate contact pressure between the contact portion of the center conductor and the circuit board.

(4) In the inventions of (1) through (3), the first dielectric body may have a lower dielectric permittivity than the dielectric permittivity of the second dielectric body. In the dielectric bodies, when the dielectric permittivity of the first dielectric body is made lower than the dielectric permittivity of the second dielectric body, the band of usable frequencies of the coaxial connector becomes wider than when the dielectric bodies are constituted by the second dielectric body alone and, as a result, makes it possible to ensure excellent signal transmission quality even in broadband mode.

(5) In the invention of (4), the first dielectric body may be made of polytetrafluoroethylene, and the second dielectric body may be made of polyetherimide.

Effects of the Invention

The present invention can provide a coaxial electrical connector that makes it easy to ensure excellent signal transmission quality even in broadband mode.

DETAILED DESCRIPTION

An embodiment of the present invention will be described below with reference to the accompanying drawings.

Figure 1:
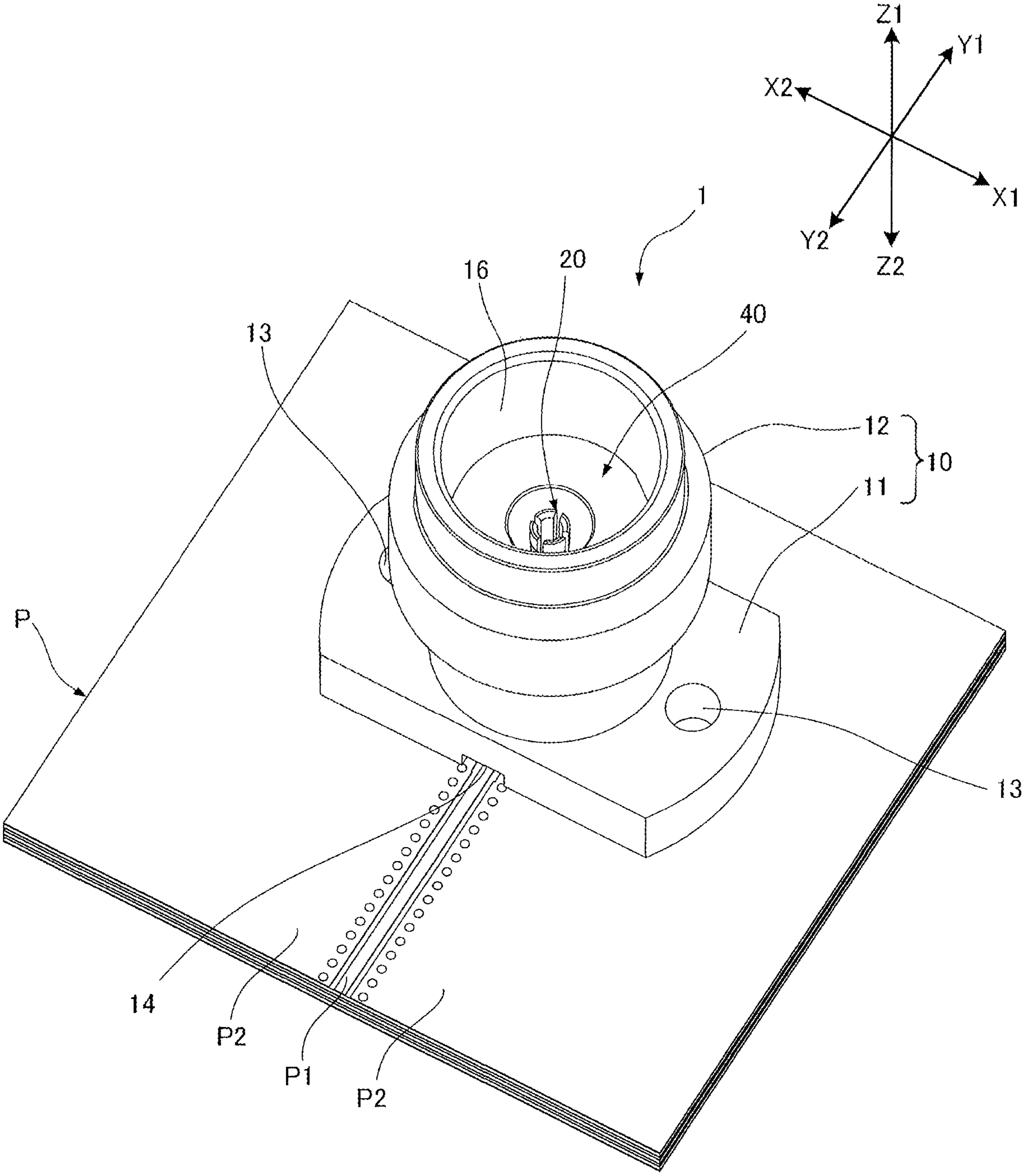
FIG. 1 illustrates a perspective view showing a coaxial electrical connector according to an embodiment of the present invention along with a circuit board, as viewed obliquely from above.
Figure 2:
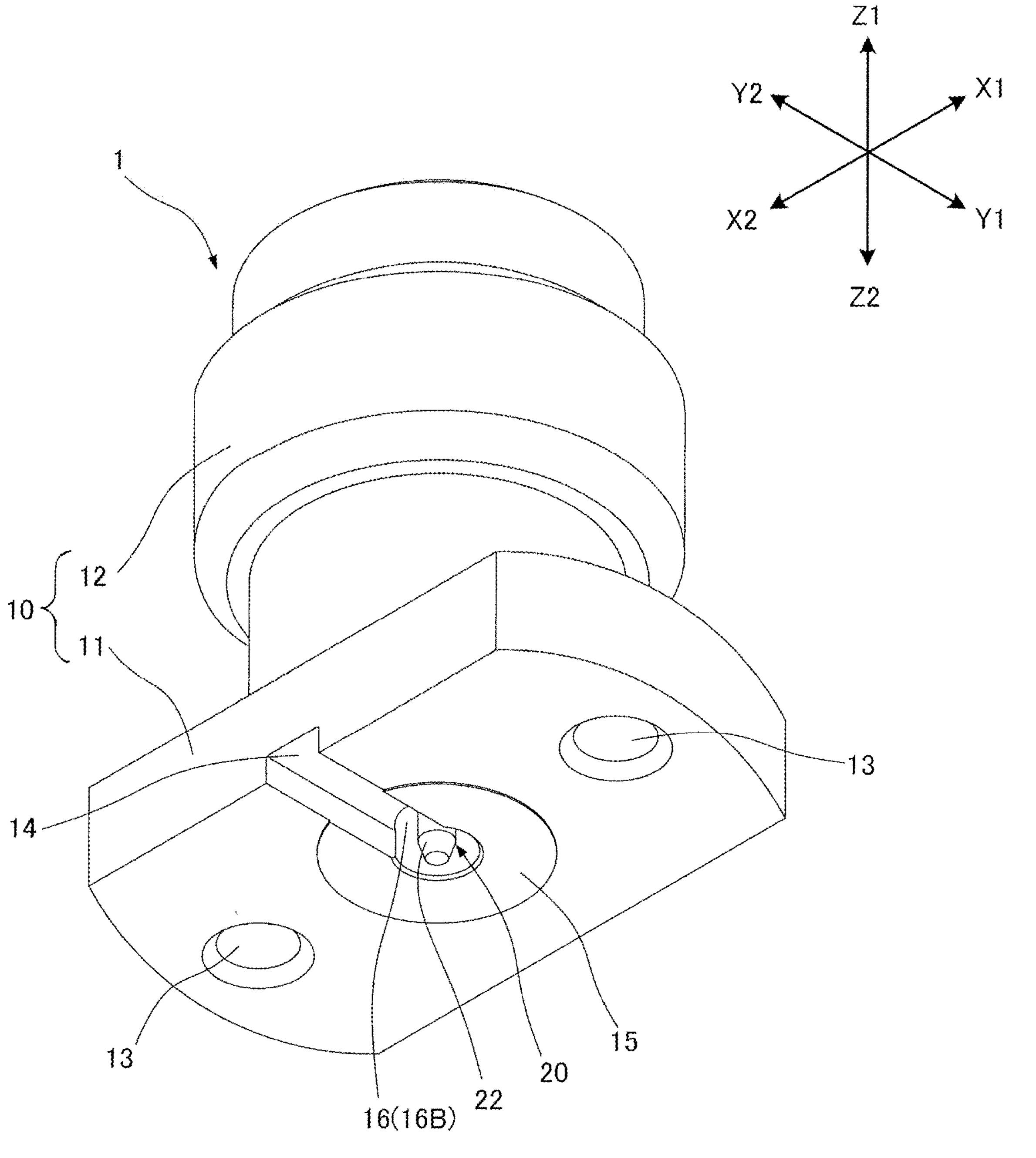
FIG. 2 illustrates a perspective view showing the coaxial electrical connector of FIG. 1, as viewed obliquely from below.
Figure 3:
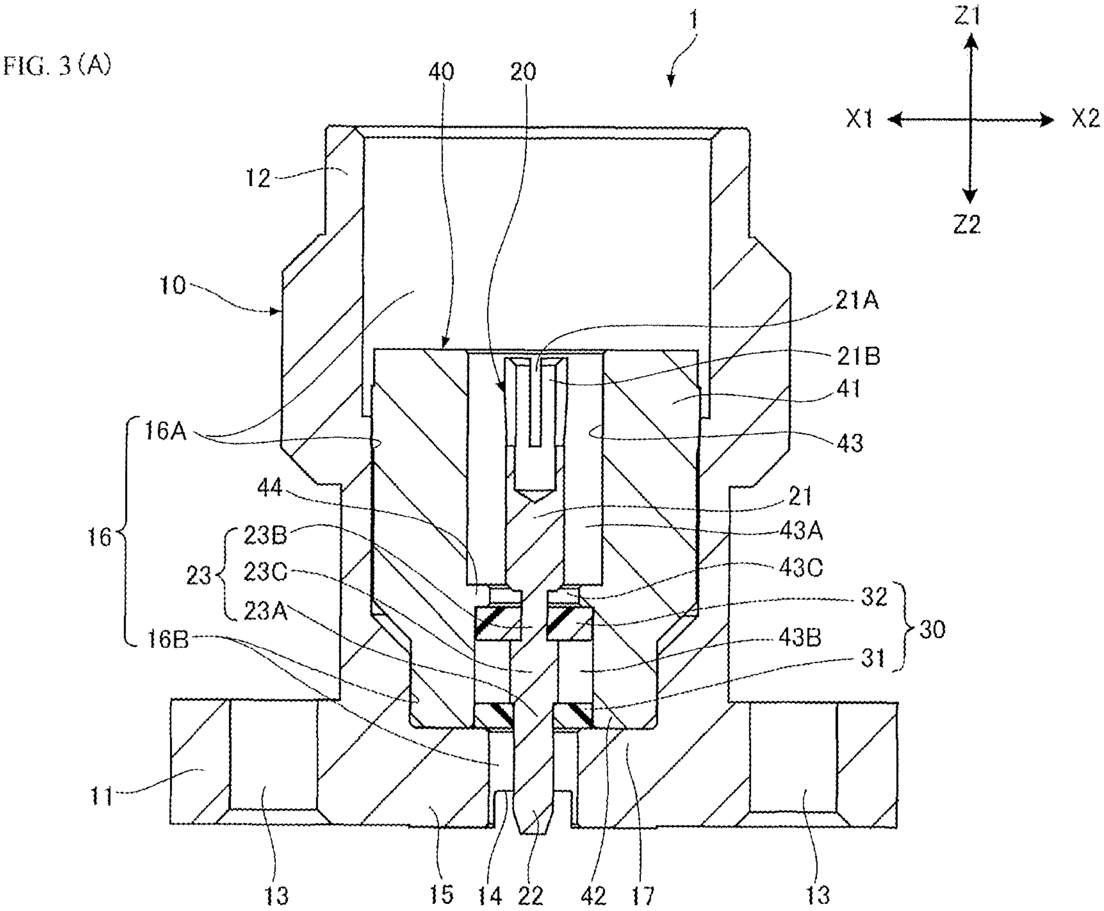
FIG. 3 (A) is a cross-sectional view of the coaxial electrical connector of FIG. 1, showing a cross-section in a plane containing the axis of the coaxial electrical connector, and FIG. 3 (B) is a cross-sectional view showing an enlarged portion of FIG. 3 (A).
Figure 3:
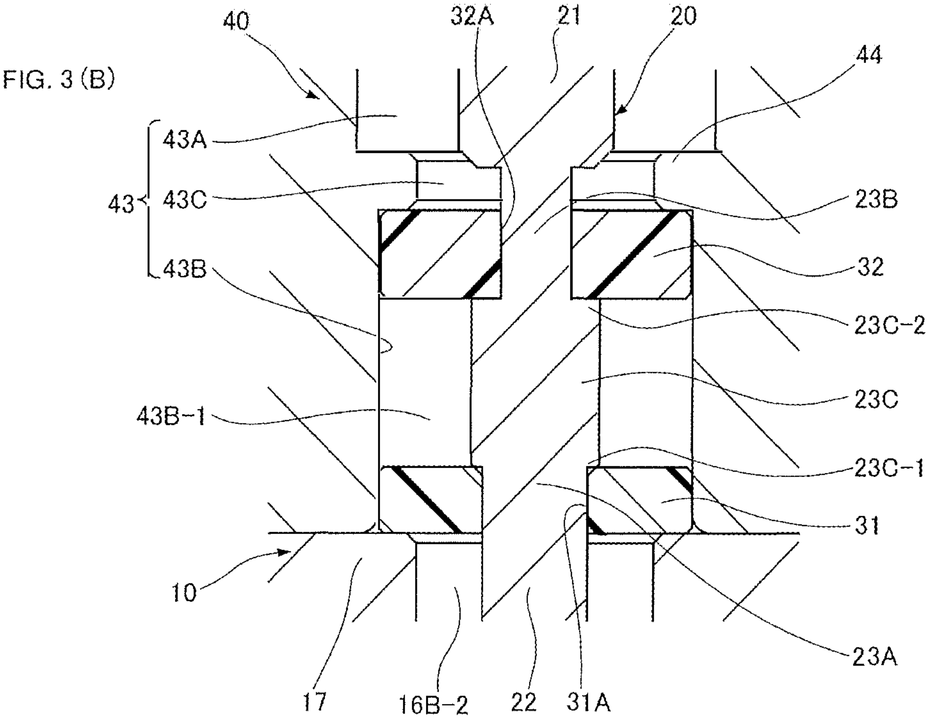

FIG. 1 is a perspective view showing a coaxial electrical connector 1 (referred to as "coaxial connector 1" hereinbelow) according to an embodiment of the present invention along with a circuit board P, as viewed obliquely from above. FIG. 1 shows only a portion of the circuit board P, which is actually formed to extend farther both in the X-axis direction and in the Y-axis direction. FIG. 2 is a perspective view showing the coaxial connector 1, as viewed obliquely from below. FIG. 3 (A) is a cross-sectional view of the coaxial connector 1 showing a cross-section in a plane containing the axis of the coaxial connector 1. FIG. 3 (B) is a cross-sectional view showing an enlarged portion of FIG. 3 (A).

The circuit board P, on which the coaxial connector 1 is mounted, is a so-called "test board" used for performance testing of electronic components such as IC chips (not shown). In addition, the coaxial connector 1 is a so-called "test connector," which is mounted to the circuit board P and is connected via a counterpart coaxial connector (not shown) and a coaxial cable (not shown) to measurement equipment (not shown) used to measure the electrical characteristics of the electronic components. As is shown in FIG. 1, a signal pattern P1 extending in the Y-axis direction on the mounting face, and a ground pattern P2 extending so as to surround the signal pattern P1, are formed on the mounting face of the circuit board P. The electronic components to be performance tested (not shown) are mounted in the vicinity of the end of the signal pattern P1 on the Y2 side, and the coaxial connector 1 is mounted in the vicinity of the end of the signal pattern P1 on the Y1 side (connector pattern portion). A counterpart coaxial connector (not shown) connected to a coaxial cable (not shown) is matingly connected to the coaxial connector 1 from above.

The coaxial connector 1, which has an axis extending in the vertical direction (Z-axis direction) perpendicular to the mounting face of the circuit board P, has a symmetrical shape in the Y-axis direction. As shown in FIG. 3, the coaxial connector 1 has a metallic outer conductor 10, a metallic center conductor 20 disposed concentrically with the hereinafter-described interior space 16 of the outer conductor 10 within said interior space 16, dielectric bodies 30 made of plastic, and a metallic support 40. In addition, the dielectric bodies 30 include a first dielectric body 31 and a second dielectric body 32 molded from materials that are different from each other.

The outer conductor 10 has a plate-shaped base portion 11, which extends parallel to the circuit board P, and a cylindrical barrel portion 12, which extends upward from the top face of the base portion 11. As shown in FIG. 1, the base portion 11 has a plate-like configuration whose longitudinal direction is the connector width direction (X-axis direction) perpendicular to the Y-axis direction in which the signal pattern P1 extends. A mounting hole portion 13, that is, a screw hole disposed through the base portion 11 in the vertical direction, is provided at each of the opposite ends sandwiching the barrel portion 12 in the connector width direction. In the present embodiment, the coaxial connector 1 is attached to the circuit board P by screwing screw members (not shown) from below into the mounting hole portions 13 and screw holes (not shown) provided in the circuit board P in alignment with said mounting hole portions 13.

As shown in FIG. 2, a bottom groove portion 14, which extends in the transverse direction of the base portion 11 (Y-axis direction) midway along the connector width direction (X-axis direction), is formed in the bottom face of the base portion 11. As shown in FIG. 3 (A), when viewed in the Y-axis direction, the bottom groove portion 14 is sunk into the bottom of the base portion 11 in a quadrangular shape, and, as shown in FIG. 2, extends in the Y-axis direction within a range spanning from the end of the base portion 11 on the Y2 side to the central portion. The groove width dimensions (dimensions in the X-axis direction) of the bottom groove portion 14 are larger than the width dimensions (dimensions in the X-axis direction) of the signal pattern P1 (see FIG. 1) and the outside diameter of the center conductor 20 (see FIG. 1 and FIG. 3 (A)). In addition, as is shown in FIG. 2, while the opposite lateral edges of the bottom groove portion 14 (edge portions extending in the Y-axis direction) have an arcuate configuration concentric with the center conductor 20 and the hereinafter-described interior space 16 in the area located in the central portion of the base portion 11, in other areas, they have a rectilinear configuration extending in the Y-axis direction. Therefore, the groove width dimensions of the bottom groove portion 14 in the areas in which the lateral edges have an arcuate configuration are larger than the groove width dimensions in the areas in which the lateral edges have a rectilinear configuration.

In addition, as shown in FIG. 2, a protrusion 15 protruding slightly beyond other regions is formed in the region extending through the middle of the bottom face of the base portion 11 (see also FIG. 3 (A)). The protrusion 15 is formed in a circular configuration with a portion thereof cut out by the bottom groove portion 14 when viewed from below. When viewed from below, this protrusion 15 is concentric with the center conductor 20. In the present embodiment, when the coaxial connector 1 is screw-attached to the circuit board P, the bottom face of the protrusion 15 is pressed against the top face of the ground pattern P2 on the circuit board P. Therefore, because the protrusion 15 on the bottom face of the base portion 11 is provided in this manner, the outer conductor 10 and the ground pattern P2 are brought into reliable surface contact in the vicinity of the center conductor, which makes it easy to ensure an excellent state of electrical communication.

The barrel portion 12 has a cylindrical configuration that has an axial centerline extending in the vertical direction and rises upwardly from the top face of the base portion 11. The barrel portion 12 has a larger diameter in the vertically intermediate portion thereof than in other portions.

The outer conductor 10 has formed therein an interior space 16, which has an axial centerline extending in the vertical direction and, as shown in FIG. 3 (A), is disposed through the base portion 11 and barrel portion 12 in the vertical direction. The interior space 16 has a large diameter space 16A and a small diameter space 16B formed downwardly of the large diameter space 16A.

The large diameter space 16A is a cylindrical space formed within a vertical range spanning from the location of the top end of the barrel portion 12 to a location proximal to the bottom end. As shown in FIG. 3 (A), the top space of the large diameter space 16A has a slightly larger diameter than the bottom space. As shown in FIG. 3 (A), the hereinafter-described large diameter portion 41 of the support 40 is accommodated within said bottom space. In addition, the top space is a space intended for receiving a counterpart coaxial connector when a counterpart coaxial connector (not shown) is matingly connected to the coaxial connector 1 from above. Once the counterpart coaxial connector has been matingly connected, the top face of the support 40 supported by the outer conductor 10 makes contact and is enabled for electrical communication with the bottom face of a counterpart outer conductor (not shown) of the counterpart coaxial connector.

The small diameter space 16B, which has a smaller diameter than the large diameter space 16A, is formed within a vertical range spanning from the location of the bottom end of the large diameter space 16A to the location of the top end of the bottom groove portion 14 of the base portion 11. As shown in FIG. 3 (A), the top space of the small diameter space 16B has a larger diameter than the bottom space. In addition, while the top space, except for the top end section, has a cylindrical configuration, the top end section has a tapered configuration whose inside diameter dimensions gradually increase as one moves upward. The inner peripheral surface of the small diameter space 16B has a stepped surface formed at the boundary between the top space and the bottom space in the vertical direction. As shown in FIG. 3 (A), a stepped portion 17, which has this stepped surface, makes surface contact with the bottom face of the support 40 and supports the support 40 from below. It should be noted that the stepped portion 17 may be adapted to support not only the support 40, but also the hereinafter-described first dielectric body 31 from below.

The center conductor 20, which has a pin-like configuration extending in the vertical direction, is provided at a location concentric with the interior space 16 when viewed in the vertical direction. As shown in FIG. 3 (A), the center conductor 20 has a connection portion 21, which is provided in the top portion and to which the counterpart center conductor (not shown) of the counterpart coaxial connector is connected; a contact portion 22, which is provided in the bottom portion and is capable of making contact with the signal pattern P1 (see FIG. 1) on the circuit board P; and a coupling portion 23, which is provided between the connection portion 21 and the contact portion 22 and couples the two portions.

As shown in FIG. 3 (A), the connection portion 21 is accommodated within the large diameter space 16A of the outer conductor 10, more particularly, within the hereinafter-described upper space 43A of the support 40 disposed within the large diameter space 16A. The top portion of the connection portion 21, which is cylindrical in shape and has slits 21A formed at a plurality of locations in the circumferential direction, has connector pieces 21B that are formed between adjacent slits 21A. The counterpart center conductor (not shown) of the counterpart coaxial connector is adapted to be inserted from above into the space enclosed by the plurality of connector pieces 21B. At this time, the plurality of connector pieces 21B are pushed apart radially outwardly of the connection portion 21 by the counterpart center conductor and become resiliently deformed, in which state they make contact with the outer peripheral surface of the counterpart center conductor under contact pressure, thereby enabling electrical communication with the counterpart center conductor.

As is shown in FIG. 3 (A), the contact portion 22, which has a columnar configuration of a smaller diameter than the connection portion 21, has a bottom end section protruding into the bottom groove portion 14 and another section accommodated within the small diameter space 16B. In addition, the distal end portion (bottom end portion) of the bottom end section of the contact portion 22 has a distal end face (bottom end face) that is located slightly downwardly of the bottom face of the protrusion 15. Because the bottom end portion of the contact portion 22 protrudes slightly from the bottom face of the protrusion 15 in this manner, the coaxial connector 1 is adapted to make reliable contact with the signal pattern P1 via this bottom end portion upon being mounted to the circuit board P.

As shown in FIG. 3 (A), the coupling portion 23, which is accommodated in the hereinafter-described lower space 43B and intermediate space 43C of the support 40, has three columnar sections of different diameter dimensions. Specifically, the coupling portion 23 has a first attachment portion 23 A located at the bottom end of the coupling portion 23, a second attachment portion 23B located at the top end of the coupling portion 23, and an intermediate portion 23C located between the first attachment portion 23 A and second attachment portion 23B in the vertical direction. When arranged in decreasing order of diameter dimensions, these columnar sections are: intermediate portion 23C, first attachment portion 23A, and second attachment portion 23B. In addition, the first attachment portion 23 A has the same diameter as the contact portion 22, and the second attachment portion 23B has a smaller diameter than the contact portion 22. The intermediate portion 23C is of a slightly larger diameter than the contact portion 22 and has a smaller diameter than the connection portion 21. The first attachment portion 23A has the first dielectric body 31 attached to its outer peripheral surface. The second attachment portion 23B has the second dielectric body 32 attached to its outer peripheral surface.

As shown in FIG. 3 (B), a first abutment portion 23C-1 having a stepped configuration is formed in the bottom end portion of the intermediate portion 23C, at the boundary with the first attachment portion 23A. The first abutment portion 23C-1 makes surface contact with, and abuts, the top face of the first dielectric body 31 from above. In other words, the first dielectric body 31 supports the first abutment portion 23C-1 from below. In addition, as shown in FIG. 3 (B), a second abutment portion 23C-2 having a stepped configuration is formed in the top end portion of the intermediate portion 23C, at the boundary with the second attachment portion 23B. Once the coaxial connector 1 is mounted to the circuit board P, the second abutment portion 23C-2 makes surface contact with, and abuts, the bottom face of the second dielectric body 32 from below. In other words, the second dielectric body 32 supports the second abutment portion 23C-2 from above.

The first dielectric body 31 is made, for example, of polytetrafluoroethylene (PTFE), and is fabricated by molding in an annular plate-like configuration. In the present embodiment, polytetrafluoroethylene, i.e., the material of the first dielectric body 31, has a dielectric permittivity of about 2.1 and a deflection temperature under load of about 55° C. As shown in FIG. 3(A) and 3(B), the first dielectric body 31 is formed to be slightly smaller in the vertical direction, in other words, thinner, than the second dielectric body 32.

The first dielectric body 31, which is formed with an outside diameter that is slightly larger than the inside diameter of the hereinafter-described lower space 43B of the support 40, is press-fitted and accommodated within the lower space 43B. As is shown in FIG. 3 (B), the first dielectric body 31 has a first through-hole portion 31A formed through the first dielectric body 31 in the vertical direction. The first through-hole portion 31A is formed with an inside diameter that is substantially equal to the outside diameter of the first attachment portion 23A of the center conductor 20.

Although in the present embodiment the first dielectric body 31 has an annular plate-like configuration that is continuous around its entire circumference, as an alternative, for example, a notch portion may be formed at a single location in the circumferential direction. In such a case, the above-mentioned notch portion may be formed such that the first dielectric body 31 is completely severed in the circumferential direction, but it may instead be formed partially such that only a portion thereof is severed.

The second dielectric body 32 is made, for example, of polyetherimide (PEI), and is fabricated by molding in an annular plate-like configuration. In the present embodiment, polyetherimide, i.e., the material of the second dielectric body 32, has a higher dielectric permittivity than the dielectric permittivity of the first dielectric body 31 (about 3.1) and a higher deflection temperature under load than the deflection temperature under load of the first dielectric body 31 (about 197 to 200° C.). The second dielectric body 32, which is a separate component from the first dielectric body 31, is provided upwardly of the first dielectric body 31 at a location spaced apart from the first dielectric body 31. The second dielectric body 32 is formed with an outside diameter that is slightly smaller than the outside diameter of the first dielectric body 31. In addition, the second dielectric body 32, which is slightly smaller than the inside diameter of the hereinafter-described lower space 43B of the support 40, has a slight gap formed in the radial direction between the outer peripheral surface of the second dielectric body 32 and the inner peripheral surface of the lower space 43B. It should be noted that the outside diameter of the second dielectric body 32 may be equal to the inside diameter of the lower space 43B. The second dielectric body 32 has a second through-hole portion 32A formed through said second dielectric body 32 in the vertical direction. The second through-hole portion 32A is formed with an inside diameter that is substantially equal to the outside diameter of the second attachment portion 23B of the center conductor 20.

In addition, a notch portion (not shown) is formed in the second dielectric body 32 at a single location in the circumferential direction. Therefore, the second dielectric body 32 is rendered discontinuous at the location of the above-mentioned notch portion in the circumferential direction. It should be noted that the above-mentioned notch portion may be formed such that the second dielectric body 32 is completely severed in the circumferential direction, but it may instead be formed partially such that only a portion thereof is severed.

The support 40, which has a substantially cylindrical configuration, is accommodated within the interior space 16 of the outer conductor 10. As shown in FIG. 3 (A), in addition to having a large diameter portion 41 in its top portion, the support 40 has a small diameter portion 42 with a smaller diameter than the large diameter portion 41 in its bottom portion. The large diameter portion 41, whose outside diameter is slightly smaller than the bottom space of the large diameter space 16A, is accommodated within in the large diameter space 16A of the outer conductor 10. In the present embodiment, the large diameter portion 41 has a section of a slightly larger diameter than other portions in the top end section and is press-fitted into the large diameter space 16A and retained by the outer conductor 10 with the help of this section. The small diameter portion 42 has a shape adapted to the top space of the small diameter space 16B. In other words, the bottom portion of the small diameter portion 42 has a cylindrical configuration, and the top portion of the small diameter portion 42, i.e., the section coupled to the large diameter portion 41, has a tapered configuration whose outside diameter dimensions gradually increase as one moves upward. The small diameter portion 42, whose outside diameter is slightly smaller than the top space of the small diameter space 16B, is accommodated within said space.

An interior space 43, which is coaxial with the interior space 16 of the outer conductor 10 and is disposed through the support 40, is formed in the support 40. As shown in FIG. 3 (B), the interior space 43 has an upper space 43A formed within a range that is substantially equal to the large diameter portion 41 of the support 40 in the vertical direction, a lower space 43B formed within a range that is substantially equal to the small diameter portion 42 of the support 40 in the vertical direction, and an intermediate space 43C formed in the vicinity of the boundary of the large diameter portion 41 of the support 40 with the small diameter portion 42 in the vertical direction. The upper space 43A is formed in the top portion of the interior space 43 and accommodates the connection portion 21 of the center conductor 20. The lower space 43B is formed with a slightly smaller diameter than the upper space 43A in the bottom portion of the interior space 43 and accommodates the coupling portion 23 of the center conductor 20, the first dielectric body 31, and the second dielectric body 32.

A supporting portion 44 radially inwardly protruding from the inner peripheral surface of the interior space 43 is provided at a location between the upper space 43 A and the lower space 43B in the vertical direction. The supporting portion 44 is formed around the entire circumference of the interior space 43, and the space enclosed by this supporting portion 44 constitutes an intermediate space 43C. The intermediate space 43C, which has a smaller diameter than the upper space 43 A and lower space 43B, accommodates the top end portion of the coupling portion 23 of the center conductor 20. In addition, as described below, the intermediate space 43C is adapted to permit resilient deformation of the second dielectric body 32 by receiving from below a portion of the second dielectric body 32 resiliently deformed upward. As shown in FIG. 3 (B), by means of the bottom face thereof, the supporting portion 44 makes surface contact with the top face of the second dielectric body 32 and supports the second dielectric body 32.

The coaxial connector 1 is manufactured in accordance with the following procedure. First, the second dielectric body 32 is attached to the second attachment portion 23B by inserting the center conductor 20, at the bottom end side, i.e., the side of the contact portion 22, through the second through-hole portion 32A of the second dielectric body 32. Although in the present embodiment the second through-hole portion 32A has a smaller diameter than the intermediate portion 23C of the coupling portion 23, a notch portion is formed in the second dielectric body 32 and, as the intermediate portion 23C is inserted through the second through-hole portion 32A, the second dielectric body 32 is deformed to produce an opening at the location of the notch portion in the circumferential direction, thereby permitting insertion of the intermediate portion 23C. Further, when the second dielectric body 32 passes through the area of the intermediate portion 23C and reaches the area of the second attachment portion 23B, the second dielectric body 32 deforms and closes at the location of the notch portion. As a result, the inner peripheral surface of the second dielectric body 32 makes surface contact with the outer peripheral surface of the second attachment portion 23B, and the second dielectric body 32 retains the second attachment portion 23B in place. In this condition, the notch portion of the second dielectric body 32 may be completely closed or may be slightly open.

Once the second dielectric body 32 is attached to the second attachment portion 23B, the top face of the second abutment portion 23C-2 of the center conductor 20 makes surface contact with, and abuts, the bottom face of the second dielectric body 32. It should be noted that at this time it is not essential for the second abutment portion 23C-2 to abut the second dielectric body 32, and the second abutment portion 23C-2 may be adapted to abut the second dielectric body 32 and support said second dielectric body 32 from below only when the coaxial connector 1 is mounted to the circuit board P.

Next, the center conductor 20 having the second dielectric body 32 attached thereto is inserted into the interior space 43 of the support 40 from below. At this time, the center conductor 20 is inserted until the second dielectric body 32 reaches the top portion of the lower space 43B of the interior space 43. As a result, the coupling portion 23 of the center conductor 20 is accommodated within the lower space 43B and intermediate space 43C.

Next, the first dielectric body 31 is attached to the first attachment portion 23A from below. At this time, the center conductor 20 is inserted at the bottom end side, i.e., the side of the contact portion, through the through-hole portion 31A of the first dielectric body 31. Once attached to the first attachment portion 23A, the first dielectric body 31 makes surface contact with, and abuts, the first abutment portion 23C-1 from below. In addition, in the present embodiment, the first dielectric body 31, whose outside diameter is slightly larger than the inside diameter of the intermediate space 43C, is press-fitted into the lower space 43B of the interior space 43 from below. Therefore, the first dielectric body 31 is acted upon and compressed by a pressure force directed radially inwardly by the inner peripheral surface of the lower space 43B, and the outer peripheral surface of the first attachment portion 23A is firmly retained by the inner peripheral surface of the first through-hole portion 31A.

On the other hand, in the present embodiment, the outside diameter of the second dielectric body 32 is slightly smaller than the inside diameter of the intermediate space 43C. Therefore, the second dielectric body 32 is not acted upon by the pressure force from the inner peripheral surface of the lower space 43B. It should be noted that the second dielectric body 32 may be formed such that its outside diameter is slightly larger than the inside diameter of the intermediate space 43C, in which case the second dielectric body 32 is subject to and compressed by a pressure force directed radially inwardly by the inner peripheral surface of the lower space 43B and the outer peripheral surface of the second attachment portion 23B is firmly retained by the inner peripheral surface of the second through-hole portion 32A. In addition, the second dielectric body 32 is supported by the supporting portion 44 of the support 40 from above.

With the center conductor 20 and the dielectric bodies 30 accommodated within the interior space 43, the second dielectric body 32 has its radially inner section supported by the second abutment portion 23C-2 from below while its radially outer section is supported by the supporting portion 44 of the support 40 from above (see FIG. 3 (B)). It should be noted that at this time it is not essential for the second dielectric body 32 to be supported by the supporting portion 44 from above, and the second dielectric body 32 may be adapted to be supported by the supporting portion 44 only when the coaxial connector 1 is mounted to the circuit board P.

Next, the support 40 is press-fitted and accommodated within the interior space 16 of the outer conductor 10 from above. The support 40 is press-fitted until its bottom face abuts the top face of the stepped portion 17 of the outer conductor 10. As a result, as shown in FIG. 3 (B), the stepped portion 17 makes surface contact with the respective bottom faces of the first dielectric body 31 and the support 40, and supports the first dielectric body 31 and support 40 from below. In addition, the contact portion 22 of the center conductor 20, except for its bottom end section, is accommodated within the small diameter space 16B, and the bottom end section protrudes downwardly from the small diameter space 16B and is located within the bottom groove portion 14 of the outer conductor 10. The attachment of the support 40 to the outer conductor 10 in this manner completes the assembly of the coaxial connector 1.

The manner of use of the coaxial connector 1 will be described next. In the present embodiment, during use, the coaxial connector 1 is mounted to a connector pattern portion of a circuit board P (test board) on which electronic components to be performance tested (IC chips, etc.) are mounted. First, the coaxial connector 1 is disposed on the circuit board P such that the mounting hole portions 13 of the outer conductor 10 are aligned with screw holes (not shown) provided in the circuit board P. The coaxial connector 1 disposed on the circuit board P in this manner is attached to the circuit board P by screwing screw members (not shown) from below into the mounting hole portions 13 and the screw holes in the circuit board P.

When the coaxial connector 1 is attached to the circuit board P, the bottom end face of the contact portion 22 of the center conductor 20 is pressed from above against the signal pattern P1 on the circuit board P, while the bottom end face of the protrusion 15 of the outer conductor 10 is pressed from above against the ground pattern P2 on the circuit board P. As a result, the center conductor 20 and the signal pattern P1, as well as the outer conductor 10 and the ground pattern P2, make contact with each other under contact pressure and enter an electrically conductive state.

As discussed previously, because the bottom end face of the contact portion 22 of the center conductor 20 is located slightly downwardly of the bottom end face of the protrusion 15 of the outer conductor 10, when the bottom end face of the contact portion 22 is pressed against the signal pattern P1 of the circuit board P from above, the bottom end portion of the contact portion 22 is acted upon by a force (reaction force) directed upward from the signal pattern P1, and the center conductor 20 moves upward. As the center conductor 20 moves upward, the radially inner section of the first dielectric body 31, under the action of friction with the outer peripheral surface of the first attachment portion 23A, undergoes resilient deformation so as to be displaced upward.

In addition, when the center conductor 20 moves upward, the second abutment portion 23C-2 of the center conductor 20 presses against the radially inner section of the second dielectric body 32 from below. The inner section of the second dielectric body 32 subject to pressure undergoes resilient deformation so as to be displaced upward, and a portion of said inner section enters the intermediate space 43C of the support 40 from below. In other words, resilient deformation of the second dielectric body 32 is made possible by the intermediate space 43C. Such resilient deformation of the second dielectric body 32 enables upward movement of the center conductor 20. In the present embodiment, vertical resilient deformation is facilitated by the fact that the second dielectric body 32, which has an annular plate-like configuration, is relatively thin in the through-thickness direction, i.e., in the vertical direction. When the second dielectric body 32 undergoes upward resilient deformation, the above-mentioned reaction force is counteracted by the resilient force generated by the second dielectric body 32. A state of contact between the contact portion 22 and the signal pattern P1 is maintained under appropriate contact pressure as a result of counteracting the above-mentioned reaction force with the help of the resilient force generated by the second dielectric body 32.

In the present embodiment, the first dielectric body 31 and second dielectric body 32 are provided in a spaced relationship in the vertical direction and, as shown in FIG. 3 (B), a space 43B-1, which forms part of the lower space 43B, is created between the first dielectric body 31 and second dielectric body 32. This means that within the extent in which this space 43B-1 is formed in the vertical direction, that is, within the extent of the intermediate portion 23C of the coupling portion 23 of the center conductor 20, an airspace is present in the radial direction between the inner peripheral surface of the support 40 and the outer peripheral surface of the intermediate portion 23C. Therefore, in comparison with the conventional case, in which a single dielectric body extending lengthwise in the vertical direction is provided between the outer conductor and the center conductor, the band of usable frequencies becomes wider in proportion to the presence of the above-mentioned airspace, which makes it possible to ensure excellent signal transmission quality even in broadband mode.

In addition, a counterpart coaxial connector (not shown) attached to one end of a coaxial cable (not shown) is matingly connected to the coaxial connector 1 from above. As a result, a counterpart center conductor (not shown) of the counterpart coaxial connector is connected to the connection portion 21 of the center conductor 20 of the coaxial connector 1, and a counterpart outer conductor (not shown) of the counterpart coaxial connector is connected to the barrel portion 12 of the outer conductor 10 of the coaxial connector 1. In addition, the other end of the coaxial cable is connected to measurement equipment (not shown) used to measure electrical characteristics. When testing the performance of electronic components, a voltage is applied to electronic components mounted to a test board and their electrical characteristics are measured using measurement equipment.

The above-described performance testing of electronic components (IC chips, etc.) is conducted based on a hypothetical environment of use with a wide temperature range (e.g., −55° C. to 105° C.). Therefore, in the coaxial connector 1 used for performance testing, it is highly desirable to prevent the state of contact with the circuit board P from being influenced by temperature changes in the above-mentioned temperature range as much as possible. In the present embodiment, the dielectric bodies 30 include two members, i.e., the first dielectric body 31 and the second dielectric body 32, that are made of different materials. The second dielectric body 32, which supports the second abutment portion 23C-2 of the center conductor 20 from above, is made of polyetherimide and has a higher deflection temperature under load than the first dielectric body 31, which is made of polytetrafluoroethylene. Accordingly, since the second dielectric body 32 is unlikely to undergo plastic deformation even if the thermal environment becomes hotter, the center conductor 20 that is acted upon by the reaction force from the circuit board P is unlikely to be moved upward from the regular position, and the above-mentioned reaction force can be adequately counteracted by the supporting force of the second dielectric body 32. As a result, it becomes easier to maintain a state of contact under appropriate contact pressure between the contact portion 22 of the center conductor 20 and the signal pattern P1 of the circuit board P.

In the present embodiment, since the first dielectric body 31 that retains the outer peripheral surface of the first attachment portion 23A of the center conductor 20 is made of polytetrafluoroethylene and has a higher resilience than the second dielectric body 32, which is made of polyetherimide, it can make contact with the outer peripheral surface of the first attachment portion 23 A at a higher contact pressure and, therefore, can retain the center conductor 20 more firmly than when the dielectric bodies 30 are constituted by the second dielectric body 32 alone.

In addition, of the two dielectric bodies 30 in the present embodiment, the first dielectric body 31 has a lower dielectric permittivity than the second dielectric body 32, and for this reason, the band of usable frequencies of the coaxial connector 1 becomes wider than when the dielectric bodies 30 are constituted by the second dielectric body 32 alone, which makes it possible to ensure excellent signal transmission quality even in broadband mode.

Although in the present embodiment the dielectric bodies 30 are retained directly by the support 40, in other words, the dielectric bodies 30 are retained indirectly by the outer conductor 10 through the medium of the support 40, it is not essential to provide a support and, for example, the dielectric body may be adapted to be retained directly by the outer conductor without providing a support.

Although in the present embodiment the coaxial connector 1 is used for the purpose of performance testing of electronic components mounted to the circuit board P, the test objects are not limited thereto, and the connector may be employed, for instance, for the purpose of performance testing of the circuit board itself. At this time, it is not essential to mount electronic components on a circuit board.

Although in the present embodiment the second dielectric body 32 is provided upwardly of the first dielectric body 31, as an alternative, the second dielectric body may be provided downwardly of the first dielectric body. In this case, a second abutment portion may be provided in the center conductor at a location that permits abutment against the second dielectric body from below. In addition, upward resilient deformation of the second dielectric body may be enabled by the space (airspace) formed between the first dielectric body and the second dielectric body in the vertical direction, i.e., below the first dielectric body and above the second dielectric body.

Although the present embodiment describes an example in which the coaxial connector 1 is used as a so-called test connector, its uses are not limited thereto and it may, for example, be mounted on circuit boards provided in electronic products.

Although in the present embodiment the entire signal pattern P1 and the entire ground pattern P2 are provided on the mounting face (top face) of the circuit board P, as an alternative, at least a portion of the signal pattern and ground pattern may be provided, for example, such that the patterns extend along the surface of a circuit board on the backside (bottom face) or in the interior of the circuit board. In this case, corresponding patterns positioned differently in the through-thickness direction of the circuit board may be connected by vias and the like.

DESCRIPTION OF THE REFERENCE NUMERALS

1 Coaxial connector
10 Outer conductor
16 Interior space
20 Center conductor
23C-2 Second abutment portion (abutment portion)
30 Dielectric bodies
31 First dielectric body
32 Second dielectric body
43B-1 Space
43C Intermediate space (space)
P Circuit board

The invention claimed is:

1. A coaxial electrical connector connected to a circuit board, the connector having:
- a metallic outer conductor having an interior space extending along an axis perpendicular to a mounting face of the circuit board;
- dielectric bodies directly or indirectly retained within the interior space by the metallic outer conductor; and
- a metallic center conductor extending within the interior space perpendicular to the mounting face, retained by the dielectric bodies, and having a bottom end portion in contact with the mounting face, wherein:
- the dielectric bodies comprise a first dielectric body and a second dielectric body, the second dielectric body being offset from the first dielectric body such that a space is formed between the first dielectric body and the second dielectric body;
- the metallic center conductor has an abutment portion abutting the second dielectric body from below;
- the first dielectric body retains the metallic center conductor in a radial direction;
- the second dielectric body, when pressed from below by the abutment portion, is resiliently deformable toward a space formed directly above the second dielectric body;
- the first dielectric body and the second dielectric body are spaced apart;
- the first dielectric body is provided below the second dielectric body; and
- the second dielectric body has a higher deflection temperature under load than the first dielectric body.

2. A coaxial electrical connector connected to a circuit board, the connector having:
- a metallic outer conductor having an interior space extending along an axis perpendicular to a mounting face of the circuit board;
- dielectric bodies directly or indirectly retained within the interior space by the metallic outer conductor; and
- a metallic center conductor extending within the interior space perpendicular to the mounting face, retained by the dielectric bodies, and having a bottom end portion in contact with the mounting face, wherein:
- the dielectric bodies comprise a first dielectric body and a second dielectric body second dielectric body being offset from the first dielectric body such that a space is formed between the first dielectric body and the second dielectric body;
- the metallic center conductor has an abutment portion abutting the second dielectric body from below;
- the first dielectric body retains the metallic center conductor in a radial direction;

the second dielectric body, when pressed from below by the abutment portion, is resiliently deformable toward a space formed directly above the second dielectric body; and the first dielectric body has a lower dielectric permittivity than the dielectric permittivity of the second dielectric body.

3. The coaxial electrical connector according to claim 2, wherein the first dielectric body is made of polytetrafluoroethylene and the second dielectric body is made of polyetherimide.

* * * * *